United States Patent [19]

Huignard et al.

[11] 4,442,455
[45] Apr. 10, 1984

[54] OPTICAL SYSTEM FOR OBSERVATION IN REAL TIME WITH SCANNING

[75] Inventors: Jean P. Huignard; Marcel Malard, both of Paris, France

[73] Assignee: Thomson-CSF, Paris, France

[21] Appl. No.: 260,784

[22] Filed: May 5, 1981

[30] Foreign Application Priority Data

May 8, 1980 [FR] France ............................ 80 10245

[51] Int. Cl.³ .............................................. H04N 5/30
[52] U.S. Cl. ................................. 358/209; 350/3.63; 350/3.64; 356/347; 356/349; 358/90
[58] Field of Search ..................... 455/604; 358/90, 95, 358/209; 356/347, 348, 349; 350/3.63, 3.64, 3.6

[56] References Cited

U.S. PATENT DOCUMENTS

| | | | |
|---|---|---|---|
| 3,615,135 | 10/1971 | Frazer .................................. | 455/604 |
| 3,632,183 | 1/1972 | Haines et al. .......................... | 358/90 |
| 3,879,988 | 4/1975 | Jacobs ................................. | 356/349 |
| 4,304,458 | 12/1981 | Huignard et al. ..................... | 356/347 |

OTHER PUBLICATIONS

Macouski-Considerations of Television Holography-Optica Acta, vol. 18, #1, 1971, pp. 31-39.

Applications of Nonlinear Phase Conjugation in Compensated Active Imaging by T. R. O'Mears; Dec. 11-15, 1978; pp. 542-553.
Dynamic Holography and Optical Image Processing by V. Markov et al., Optics and Laser Technology; Apr. 1979; vol. 11, #2, pp. 95.-99.
L'holographie en Temps Reel Est Desormais Possible; Mesures Regulation Automatisme; vol. 44, #12, pp. 602-604.

Primary Examiner—Joseph A. Orsino, Jr.
Attorney, Agent, or Firm—Oblon, Fisher, Spivak, McClelland & Maier

[57] ABSTRACT

An optical observation system in accordance with the invention comprises illumination means by scanning the object and means for detecting the radiation diffracted by the object. It also comprises an interaction medium in which the wave emerging from the object interferes with a pumping wave in order to induce in it a system of layers diffracting in real time a replica of the object wave propagating in the direction of said wave and a complex conjugate wave propagating in the opposite direction. These waves, which are isomorphic of the object wave help to improve the detection of the object.

3 Claims, 5 Drawing Figures

OPTICAL SYSTEM FOR OBSERVATION IN REAL TIME WITH SCANNING

BACKGROUND OF THE INVENTION

The invention relates to the field of optical detection and the formation of extensive object images. It more specifically relates to an optical system for observation in real time which utilizes, for the purpose of amplifying the signal to be detected, the possibility provided by certain media of generating in real time a complex wave front.

The invention aims to improve the detection and imaging of extensive and/or remote objects.

Known observation and detection devices generally comprise a light source making it possible to illuminate the object to be detected via an illumination device transmitting energy radiated by the source onto the object. The illuminated object reflects at least part of the radiation received to a detection device comprising, inter alia, a collecting optical system which serves to form an image of the illuminated object on a detector, photosensitive support, photodetector, mosaic of photodetectors, vidicon, etc.

It is known to increase the sensitivity of the system by concentrating the illuminating beam onto a point of the object and by means of an X-Y deviator making the said beam undergo scanning in such a way that it successively illuminates all the points of the object. In this case, it is advantageous to receive the optical signal to be detected on a photodetector coupled to a television-type display, whose scanning is synchronous with the X-Y deviator. Thus, a bidimensional image of the object is obtained on the display.

For the purpose of detecting remote objects, it is advantageous to use infrared radiation, which is absorbed less by the ambient medium than visible radiation. The disadvantage is that in this wavelength range the detectors are not very sensitive.

The real time observation system according to the invention comprise the main elements of a conventional detection system. However, in order to significantly amplify the optical signal to be detected, a device able to generate in real time a complex wave front, isomorphic of the wave front of the optical signal to be detected and which serves to strengthen it is inserted into the same. By traversing said device and in conjunction with a pumping wave, the wave to be detected coming from the object records a diffraction grating therein. Following a recording time, the device diffracts a replica of the object wave, which contains part of the energy of the pumping wave and which is phase-matched with the object wave for the complete wave front. This replica can have a much greater intensity than the wave to be detected and is used in the system according to the invention for strengthening it on the detector, particularly by using a heterodyne detection.

BRIEF SUMMARY OF THE INVENTION

The present invention relates to an optical system for the real time observation of an object comprising a radiation source, a deviator ensuring the scanning of the object by means of a concentrated beam of radiated energy from the source, optical means for the detection of the radiation emerging from the illuminated area of the object, the radiation from the object being transmitted by inverse return, via the deviator and means for the display of an image of the object produced from the signals from the optical detection means, the coherent source supplying in addition to the concentrated beam a pumping beam, the beam from the object and the pumping beam interfering in an interaction medium in which the spatial modulation of light intensity resulting from the interference fringes induces in the said medium a spatial modulation of the refractive index, the system of layers photoinduced in this way diffracting a fraction of the energy of the pumping wave in the form of a wave front isomorphic of that emanating from the object.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

The system according to the invention involves the restoration of a wave front of complex morphology, generated by interference, in an interaction medium of an incident optical wave having the said wave front with a pumping wave.

Figure 1:
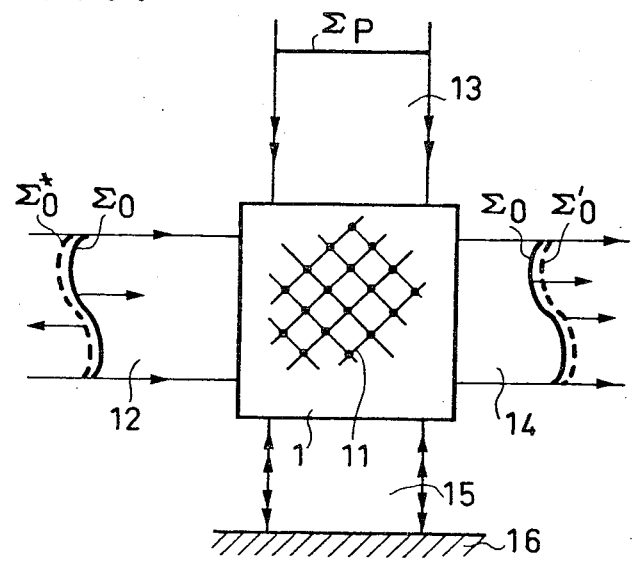
FIG. 1 a circuit diagram of the operation of the interaction medium used in the system according to the invention.

This interference is produced in a three-dimensional medium, indicated at 1 in FIG. 1 and whose physical characteristics and in particular the refractive index are spatially modulated by a system of fringes 11 from the interference of the incident optical wave 12 of wave front $\Sigma_o$ and the pumping wave 13 of wave front $\Sigma_p$, which can e.g. be planar. Due to the existence of this spatial modulation which induces by gradiant a system of layers, a fraction of the energy of the pumping wave is diffracted in the form of an emergent wave 14 of wave front $\Sigma_o'$ having characteristics isomorphic of the incident wave, whereof part emerges unchanged from the medium in accordance with the wave front $\Sigma_o$. The wave $\Sigma_o'$ is propagated in the same direction as wave $\Sigma_o$, as indicated by the small arrows associated with these wave fronts in FIG. 1.

Another fraction of the energy of pumping wave 13 traverses medium 1 and passes out along beam 15. Wave 15 is reflected into medium 1 by positioning a reflector in its path and perpendicular thereto. Part of the energy is diffracted by the system of layers recorded in the medium in the form of an emergent wave of complex wave front $\Sigma_o^*$, conjugate with wave $\Sigma_o$. $\Sigma_o^*$ has characteristics which are isomorphic to those of $\Sigma_o$, but follows its path in the opposite direction, as indicated in the small arrows in FIG. 1. $\Sigma_o^*$ is reversed towards the object from which emanates $\Sigma_o$.

Figure 2:
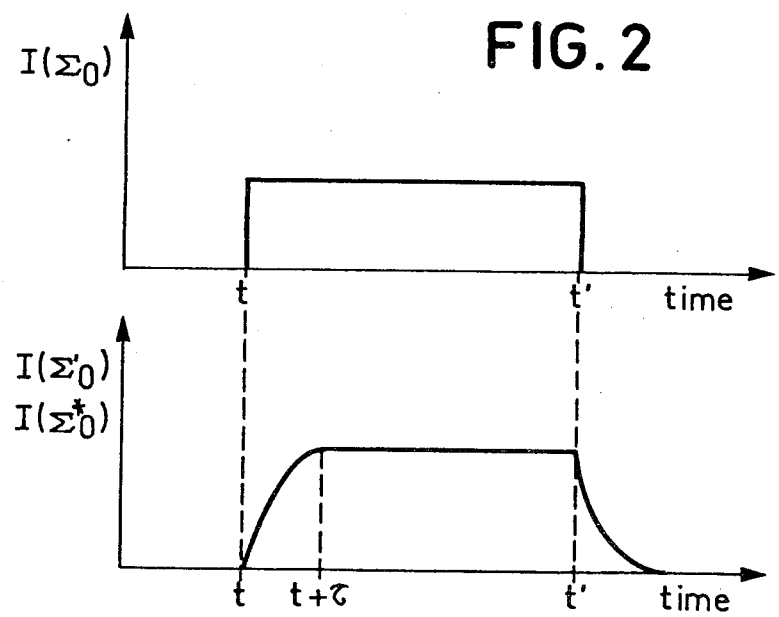
FIG. 2 a diagram showing as a function of time the establishment of the replica wave emerging from the said medium.

These waves $\Sigma_o'$ and $\Sigma_o^*$ are restored in real time to within the time $\tau$ for establishing the system of layers, as indicated in the diagrams of FIG. 2. If the wave $\Sigma_o$ is established in medium 1 between time t and t', the waves $\Sigma_o'$ and $\Sigma_o^*$ are established with a time constant $\tau$ and disappear in the similar manner.

As a function of the materials forming medium 1, the time constant $\tau$ varies from $10^{-3}$ to $10^{-12}$ seconds. This phenomenon of the real time restoration of a complex wave front from a planar pumping wave is often called "dynamic holography" and the medium 1 "dynamic hologram support". This medium is also designated in certain cases by the term nonlinear interaction medium.

Variations in the system of fringes can be induced by variations of the incident wave, due for example to a scanning of the object or a frequency shift between the incident wave and the pumping wave. The operating condition for the device is that these variations are slow compared with the time constant $\tau$. It is necessary that the system of mobile layers can be effectively established in the interaction medium.

In the case of a frequency shift between the object wave and the pumping wave, with a view to carrying out a heterodyne detection, it is of interest to note the frequencies of the different waves involved in the system. Thus, $\omega_o$ is the frequency of the object wave of wave front $\Sigma_o$ and $\omega_o$ and $\omega_1 = \omega_o + \Delta\omega$ the frequency of the pumping waves of wave front $\Sigma_p$ and $\Sigma_{p1}$. Under these conditions, a replica wave of wave front $\Sigma_o'$ and frequency $\omega_o + \Delta\omega$ emanates from the interaction medium. On interposing a retroreflecting mirror, there is also a conjugate wave of wave front $\Sigma_o^*$ and frequency $\omega_o$.

It is also important to note that the energy of the restored waves $\Sigma_o'$ and $\Sigma_o^*$ sampled by the system of layers on the pumping wave may be by no means negligible compared with the energy of the "incident" wave $\Sigma_o$ entering medium 1.

The media making it possible to obtain the interaction referred to hereinbefore are as follows:

(a) liquid transparent media such as carbon sulphide cell or solid transparent media such as germanium wafers, said media being usable for wavelengths remote from the absorption band, i.e. up to about 10 microns;

(b) semiconductor materials such as SI, Cd Te, HgCdTe or gaseous media (sodium vapour) used in the vicinity of the absorption band;

(c) the actual laser medium, such as YAG, RUBY or $CO_2$ laser usable at the inherent wavelength of the laser;

(d) photoconductive electro-optical materials such as BSO (bismuth and silicon oxide) or BGO (bismuth and germanium oxide).

For the first three categories of materials the recording of the dynamic hologram requires high power densities on the pumping beam of 10 MWcm$^{-2}$ to 1 kWcm$^{-2}$.

For the last category, the index modulation results from the simultaneous presence of a space charge effect and the linear electrooptical effect (photo-refractive effect). The requisite power densities are low, i.e. from 1 to 10 mWcm$^{-2}$ for a wavelength of $\lambda = 0.5$ micron.

In the observation system according to the invention, the two or three dimensional object to be observed is illuminated point by point or small zone by small zone by scanning a lighting beam focused onto the centre plane of the object. The beam re-emitted at each instant is taken up and transmitted onto a detector which, associated with a display makes it possible to obtain a bidimensional image of the object. This system also comprises an interaction medium of the type described hereinbefore in order to strengthen the optical signal to be detected.

Figure 3:
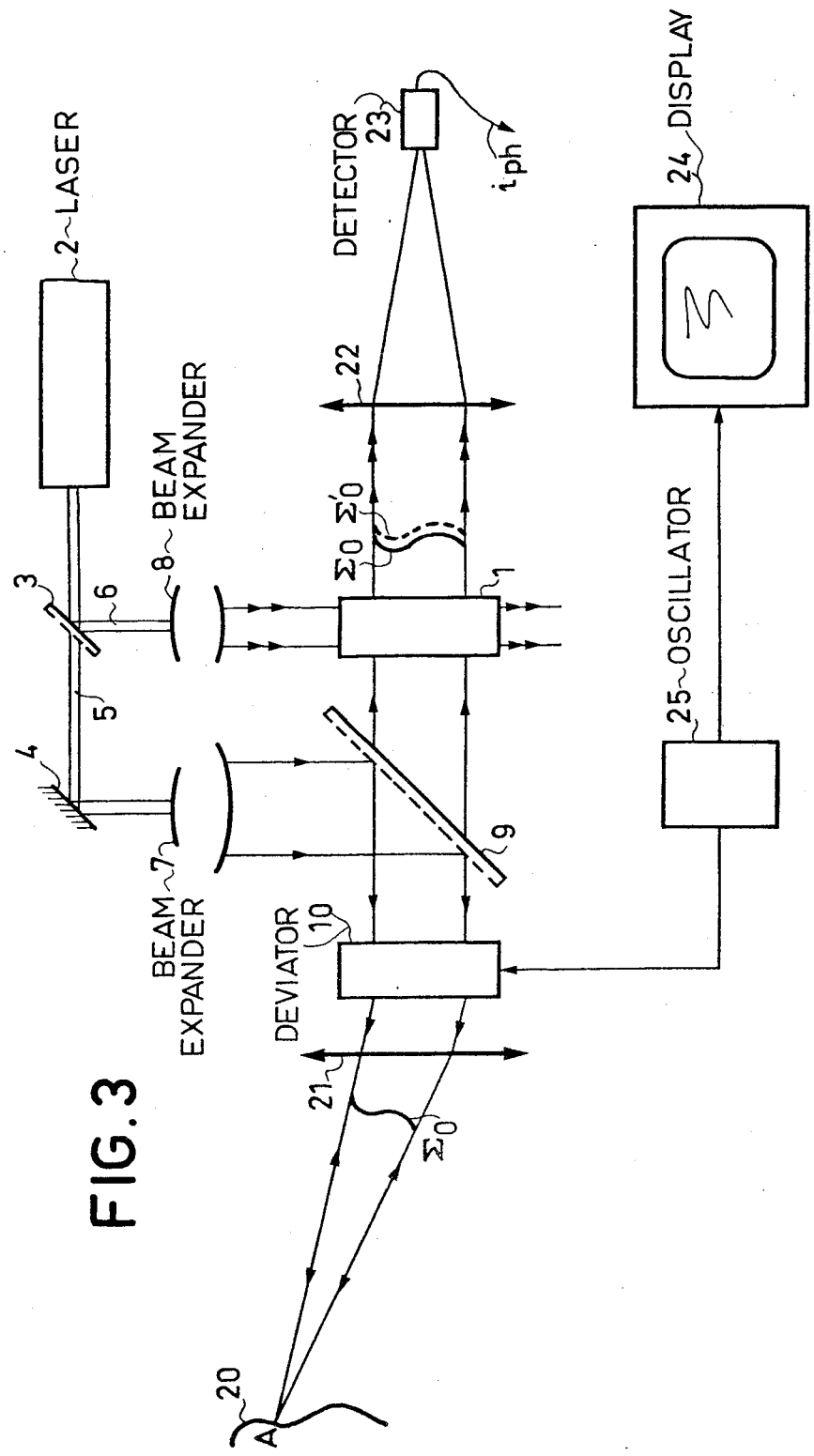
FIG. 3 a diagram of an embodiment of the system according to the invention.

A first embodiment of this system is shown in FIG. 3. A laser 2 transmits a parallel beam of coherent light onto the semireflecting plate 3, which divides it into an illuminating beam 5 of object 20 and a pumping beam 6. The illuminating beam of the object is deviated by mirror 4 onto a beam expander 7, where it is expanded and reaches a semireflecting plate 9, which transmits it to an X-Y deviator 10, comprising a conventional component such as a galvanometer mirror or an acousto-optical cell. It is then taken up by a focusing optical system 21, whose focal plane is substantially on the object 20 to be detected and at a given time the illuminating beam illuminates a point A of the object. This point re-emits light constituting a beam which, by inverse return, again passes through the optical system 21 and deviator 10, which re-centres it on the optical axis of the system. This beam emerging from the object passes through the semitransparent plate 9 and reaches the interaction medium 1.

The pumping beam 6 reflected by the semireflecting plate 3 is expanded by means of beam expander 8 and reaches the interaction medium 1. In this medium, the interaction of the object beam and the pumping beam induces a system of layers. A fraction of the energy of the pumping wave is diffracted in the form of an emergent wave $\Sigma_o'$ with characteristics isomorphic of those of the object wave $\Sigma_o$ which emerges unchanged from medium 1. Everything takes place as if the wave $\Sigma_o$ had been amplified. The beam to be detected, containing the energy of $\Sigma_o$ and $\Sigma_o'$ is focused onto the detector 23 placed in the focal plane of a collecting optical system 22. The detected signal is displayed on a television-type display 24, whereof the scanning is synchronous with respect to the X-Y deviator. Synchronization is ensured by the X-Y oscillator 25, which controls the scanning of the display and of the deviator. A bidimensional image of the object is obtained on the display.

To ensure that this device operates under satisfactory conditions, it is necessary to ensure that the scanning time of an element of the object is not too small compared with the time constant $\tau$ of the interaction medium 1.

If N scannings of the object are integrated into the plane of the detector, the gain on the signal-to-noise ratio is proportional to $\sqrt{N}$. Under these conditions, there is a reduction in the speckle due to coherent light and an image is obtained, whose quality is close to that of incoherent lighting.

One important feature of this system makes it suitable for heterodyne detection, this being the maintenance of isomorphism of the replica wave $\Sigma_o'$ with the object wave on using two pumping waves at frequencies $\omega_o$ and $\omega_1 = \omega_o + \Delta\omega$.

For a heterodyne detection, the wave to be detected and a wave coming from a local oscillator having a slight frequency shift are made to interfere on a square-law detector. The signal-to-noise ratio is compared with a homodyne detection of the type described hereinbefore.

In the system according to the invention, the replica wave $\Sigma_o'$ fulfils the function of the wave from the local oscillator. This wave $\Sigma_o'$ is perfectly isomorphic of the object wave to be detected for all the points of the wave front, no matter what its shape.

Figure 4:
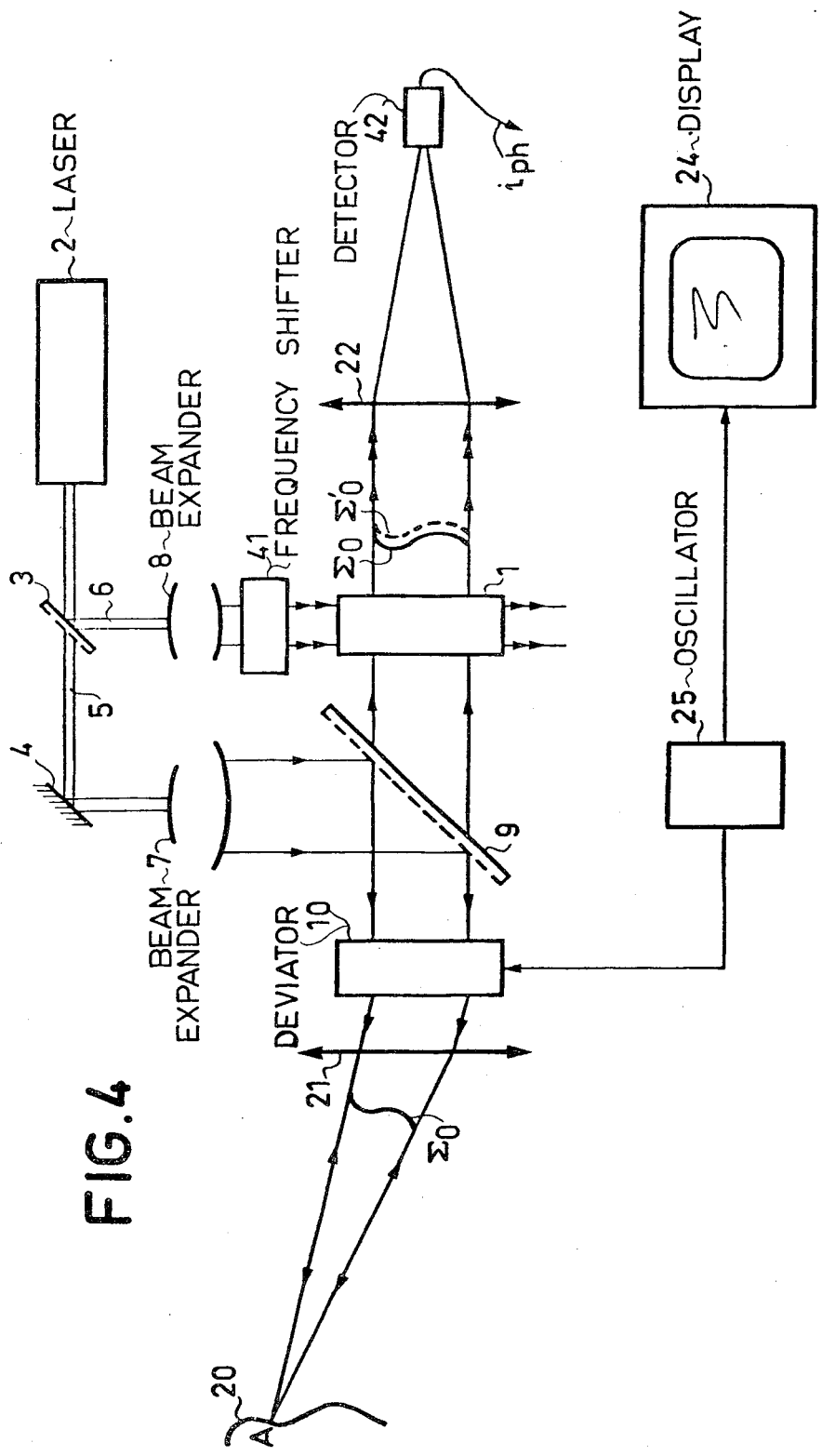
FIG. 4 a variant of this embodiment.

The adaptation of the system described hereinbefore with reference to FIG. 3 to heterodyne detection takes place by adding means making it possible to generate the two pumping waves at frequencies $\omega_o$ and $\omega_1 = \omega_o + \Delta\omega$. Such an observation system with heterodyne detection is shown in FIG. 4, which has the main elements of the system of FIG. 3 and in particular the coherent source 2 which supplies the beam 5 for illuminating object 20, the pumping beam 6, the beam expanders 7, 8, the semitransparent plate 9 which transmits to object 20 the illuminating beam deviated by deviator 10 and concentrated by the optical system 21. As a result of inverse return, the beam diffracted by the illuminated point of the object at a given time again passes through the deviator which centres it on the optical axis of the system and it reaches the interaction medium 1. In the present case, it is the pumping beam 6 which is frequency-shifted by device 41, in this case an acousto-optical cell, interposed between the beam expander 8 and the interaction medium 1.

Provided that the frequency shift between the two waves does not lead to lighting or illumination variations which are faster than the recording time of medium 1, the interference of these two waves in this medium records a system of layers bringing about the diffraction of a beam of wave front $\Sigma_o'$ and a replica of $\Sigma_o$. These two waves $\Sigma_o'$ and $\Sigma_o$, which have a slight frequency-shift then interfere, via optical system 22 on the square-law detector 42, where the signal is analysed about the difference frequency between the two waves. This detector generates an electrical signal $i_{ph}$ displayed on the television-type display 24, which is scanned synchronously with deviator 10 by means of oscillator 25. Thus, a bidimensional image of the object is obtained on the display.

In the embodiments of the observation system described with reference to FIGS. 3 and 4, only part of the energy of the pumping wave is deflected and namely that which is directly diffracted by the system of layers induced in the interaction medium 1. Another part of the energy of this beam traverses the said medium without undergoing diffraction, i.e. the beam represented at 15 in FIG. 1. As has been explained with reference to FIG. 1 this beam can be reflected towards the interaction medium by means of a mirror. This return pumping energy is diffracted in the medium by the system of layers and forms a wave front conjugate of the wave front coming from the object. The conjugate wave front emerges from the medium and is propagated in the direction from where the object wave comes, being at each point of its path isomorphic of the object wave front at this point. By inverse return this conjugate wave is returned to the object and intensifies the illumination of point A from which came the object wave used for generating the same. As a result, this point is brighter and in certain cases may permit a detailed observation of said point with stoppage of the scanning thereof and analysis by a composite detector. This conjugate wave is also at least partly diffracted by the object in the direction of travel of the initial object wave and contributes to the strengthening of the latter.

To a certain extent, this constitutes an energy recovery, which can be utilized for further amplifying the signal to be detected.

Figure 5:
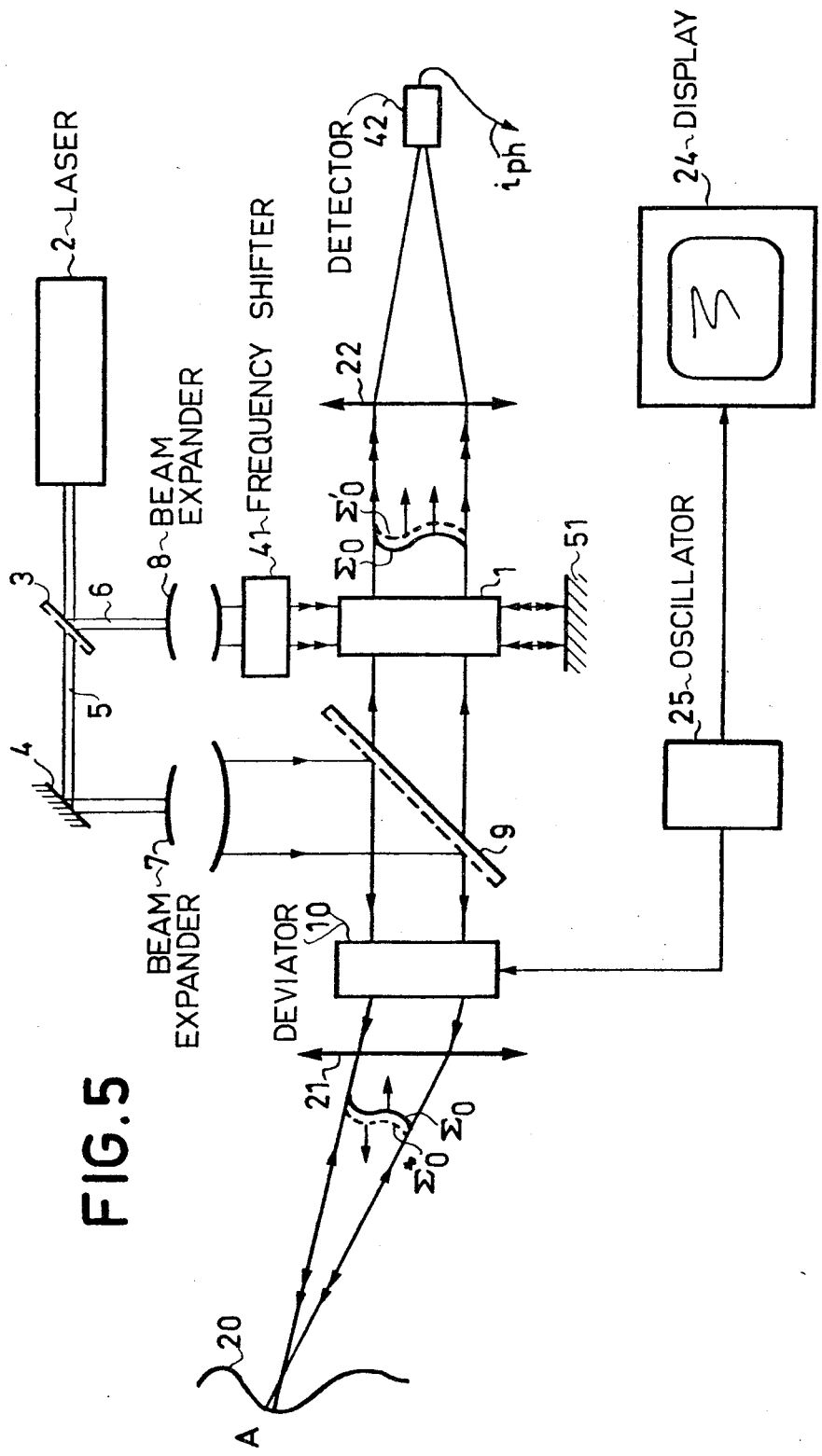
FIG. 5 another embodiment of the system according to the invention.

An embodiment of the system utilizing this recovery is shown in FIG. 5, relating to an observation system with heterodyne detection.

As in the preceding embodiments, a laser 2 supplies the total optical energy of the system. It emits a parallel beam separated into an illuminating beam 5 of the object and a pumping beam 6 by the semitransparent plate 3. The object illuminating beam deviated by mirror 4 and expanded by beam expander 7 is transmitted to the deviator 10 via a semitransparent plate 9.

At a given time, it illuminates a point A or a small region around A, depending on the shape of the object at this point when focused by optical system 21, whose focal plane is located substantially on object 20, which is not necessarily planar. At the time represented in FIG. 5, the illuminated point is located in a cavity of the object and beam 5 illuminates a small portion of said cavity. The illuminated point or the small illuminated area re-emits radiation, whereof at least part, by inverse return, re-traverses optical system 21, then deviator 10 and, in accordance with the axis of the optical system, reaches the interaction medium 1 with a wave front $\Sigma_o$ dependent on the shape of the illuminated "point" and optionally inhomogeneities of the index of the traversed medium.

Pumping beam 6, expanded by expander 8 passes through the acousto-optical cell 41 and also passes into medium 1.

In this medium, the object and pumping beams at least partly interact and induce a system of layers, which diffracts part of the pumping beam along a wave front $\Sigma_o'$, which is a replica of $\Sigma_o$, in the propagation direction $\Sigma_o$. As in the embodiment of FIG. 4, $\Sigma_o'$ fulfils the function of a wave generated by the local oscillator for the heterodyne detection of the object. The two waves $\Sigma_o$ and $\Sigma_o'$ interfere on the detector 42, where they are focused by lens 22.

The detector which advantageously analyses the signal about the difference frequency of the two waves generates a signal $i_{ph}$, which is displayed on the television-type display 24, whose scanning is synchronous with the X-Y deviator 10. The same oscillator 25 controls the synchronization of the scanning operations.

Another part of the pumping beam reaching medium 1, traverses it without being diffracted by the system of layers. This beam fraction is reflected back into the medium by placing mirror 51 in its path. Part emerges therefrom in accordance with a complex wave, conjugate of the incident object wave, with a wave front $\Sigma_o^*$. Wave $\Sigma_o^*$ is propagated in the opposite direction to $\Sigma_o$ and is therefore reflected back towards the object with a wave front which is identical along all points of its path to the wave front $\Sigma_o$ coming from the object and which, in the opposite direction, may presently undergo all the deformation undergone by $\Sigma_o$. Thus, the conjugate wave $\Sigma_o^*$ reaches the object at the "point" from where $\Sigma_o$ comes and provides additional lighting at this "point", which can be very substantially in view of the fact that, as a function of the interaction effectiveness, said conjugate wave can be much more intense than the actual object wave.

This addition lighting can permit a direct observation, e.g. with the naked eye, of the complete object, part of the object or a point thereof, as a function of the scanning amplitude which can be stopped to see a precise point of the object.

This additional radiation also at least partly passes in the direction of the detection system and assists in strengthening the object wave $\Sigma_o$.

What is claimed is:

1. An optical system for the real time observation of an object comprising a coherent radiation source, a deviator ensuring the scanning of the object by means of a concentrated beam of radiated energy from the source, optical means for the detection of the radiation emerging from the illuminated area of the object, the radiation from the object being transmitted by inverse return, via the deviator and means for the display of an image of the object produced from the signals from the optical detection means, the coherent source applying in addition to the concentrated beam a pumping beam, the beam from the object and the pumping beam interfering in an interaction medium in which the spatial modulation of light intensity resulting from the interference fringes induces in the said medium a spatial modulation of the refractive index, the system of layers photoinduced in this way diffracting a fraction of the energy of the pumping wave in the form of a wave front isomorphic of that emanating from the object and frequency changing means on the pumping beam path in order to perform a heterodyne detection.

2. A system according to claim 1 which also comprises a composite detector and means making it possible to control the stopping of scanning for illuminating a given point of which a detailed analysis is required.

3. An optical system for the real time observation of an object comprising:
- a coherent radiation source;
- a deviator insuring the scanning of the object by means of a concentrated beam of radiated energy from the source;
- optical means for the detection of the radiation emerging from the illuminated area of the object, the radiation from the object being transmitted by inverse return, via the deviator;
- means for the display of an image of an object produced from the signals from the optical detector means, the coherent source supplying in addition to the concentrated beam a pumping beam, the beam from the object and the pumping beam interfering in an interaction medium in which the spatial modulation of light intensity resulting from the interference fringes induces in the said medium a spatial modulation of the refractive index, the system of layers photoinduced in this way diffracting a fraction of the energy of the pumping wave in the form of a wavefront isomorphic of that emanating from the object;
- frequency changing means on the pumping beam path in order to perform a heterodyne detection; and
- a mirror for reflecting that fraction of the pumping beam which has passed through the interactive medium without being diffracted to the interaction medium, said mirror being perpendicular to the path of said beam fraction, the complex conjugate wave of the thus generated object wave producing additional lighting of the object.

* * * * *